US012668013B2

(12) United States Patent
Hioki

(10) Patent No.: US 12,668,013 B2
(45) Date of Patent: Jun. 30, 2026

(54) INFLATION MOLDING DEVICE

(71) Applicant: SUMITOMO HEAVY INDUSTRIES, LTD., Tokyo (JP)

(72) Inventor: Kazuya Hioki, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 251 days.

(21) Appl. No.: 18/336,064

(22) Filed: Jun. 16, 2023

(65) Prior Publication Data

US 2023/0321888 A1    Oct. 12, 2023

Related U.S. Application Data

(63) Continuation of application No. PCT/JP2022/013698, filed on Mar. 23, 2022.

(30) Foreign Application Priority Data

Mar. 31, 2021    (JP) ................................. 2021-060746

(51) Int. Cl.
  B29C 48/92 (2019.01)
  B29C 48/00 (2019.01)
  B29C 55/28 (2006.01)

(52) U.S. Cl.
  CPC .......... B29C 48/92 (2019.02); B29C 48/0018 (2019.02); B29C 55/28 (2013.01); *B29C 2948/92209* (2019.02); *B29C 2948/92447* (2019.02)

(58) Field of Classification Search
  CPC ......... B29C 48/92; B29C 55/28; B29C 48/00; B29C 48/0018; B29C 2948/92209; B29C 2948/92447
  See application file for complete search history.

(56) References Cited

U.S. PATENT DOCUMENTS

| | | | |
|---|---|---|---|
| 4,243,619 A * | 1/1981 | Fraser | ........................ C08J 5/18 264/237 |
| 6,283,185 B1 | 9/2001 | Rivaton | |

(Continued)

FOREIGN PATENT DOCUMENTS

| CN | 1296440 A | 5/2001 |
|---|---|---|
| CN | 109843545 A | 6/2019 |

(Continued)

OTHER PUBLICATIONS

International Search Report of PCT/JP2022/013698, mailed on Apr. 26, 2022.

(Continued)

*Primary Examiner* — Alison L Hindenlang
*Assistant Examiner* — Shibin Liang
(74) *Attorney, Agent, or Firm* — WTA IP Law P.C.

(57) ABSTRACT

An inflation molding device includes a viscosity estimation unit that estimates a viscosity of a bubble discharged in a substantially cylindrical shape from a die, a temperature identification unit that identifies a temperature of the bubble, and a parameter estimation unit that estimates a viscosity parameter of the bubble based on the viscosity of the bubble estimated by the viscosity estimation unit and the temperature of the bubble identified by the temperature identification unit.

4 Claims, 4 Drawing Sheets

(56)                References Cited

U.S. PATENT DOCUMENTS

| | | | | |
|---|---|---|---|---|
| 2003/0068951 | A1* | 4/2003 | Boggs ................... | B29C 48/885 |
| | | | | 442/394 |
| 2006/0197247 | A1 | 9/2006 | Speight | |
| 2012/0083915 | A1 | 4/2012 | Allan et al. | |
| 2018/0361647 | A1 | 12/2018 | Nakano | |
| 2019/0315037 | A1 | 10/2019 | Schumacher et al. | |
| 2023/0219274 | A1* | 7/2023 | Merrill ................... | B29C 48/92 |
| | | | | 264/401 |

FOREIGN PATENT DOCUMENTS

| | | | |
|---|---|---|---|
| CN | 111745938 | A | 10/2020 |
| EP | 3715090 | A1 | 9/2020 |
| JP | H11-192660 | A | 7/1999 |
| JP | 2011-173276 | A | 9/2011 |
| JP | 2017-177348 | A | 10/2017 |
| JP | 2019-166797 | A | 10/2019 |
| JP | 2020-157655 | A | 10/2020 |
| JP | 2020-163623 | A | 10/2020 |

OTHER PUBLICATIONS

European search report of EP Application No. 22780419.2 Mailed on Sep. 9, 2024.
Office Action of the corresponding CN Application No. 202280009105.6 Mailed on Dec. 16, 2025.

\* cited by examiner

100

120

INFLATION MOLDING DEVICE

CROSS-REFERENCE TO RELATED APPLICATIONS

This is a bypass continuation of International PCT Application No. PCT/JP2022/013698, filed on Mar. 23, 2022, which claims priority to Japanese Patent Application No. 2021-060746, filed on Mar. 31, 2021, which are incorporated by reference herein in their entirety.

BACKGROUND

Technical Field

A certain embodiment of the present invention relates to an inflation molding device.

Description of Related Art

An inflation molding device that extrudes a melted molding material in a film shape from a discharge port of a die and that solidifies the molding material with cooling air from a cooling unit to mold into a film is known. In the related art, a film molding device that keeps a film thickness within a target range by adjusting the width of a discharge port and the air speed and air temperature of cooling air from a cooling unit is proposed.

SUMMARY

According to an embodiment of the present invention, there is provided an inflation molding device including a viscosity estimation unit that estimates a viscosity of a molding material discharged in a substantially cylindrical shape from a die, a temperature identification unit that identifies a temperature of the molding material, and a parameter estimation unit that estimates a viscosity parameter of the molding material based on the viscosity estimated by the viscosity estimation unit and the temperature identified by the temperature identification unit.

In addition, according to another embodiment of the present invention, there is provided an inflation molding device. The device includes a stress estimation unit that estimates a stress distribution of a molding material discharged in a substantially cylindrical shape from a die and a viscosity estimation unit that estimates a viscosity distribution of the molding material based on the stress distribution estimated by the stress estimation unit.

DETAILED DESCRIPTION

The present invention is devised in such a situation, and it is desirable to provide an inflation molding device having an improved commercial value.

Any combination of the components described above and a combination obtained by switching the components and expressions of the present invention between methods, devices, and systems are also effective as an aspect of the present invention.

The present embodiment is an inflation molding device. Before specifically describing the present embodiment, some issues will be described.

In a case where molding conditions are changed for some reason in the inflation molding device, for example, a film breaks in some cases by changing the molding conditions. In a case where the film breaks, the inflation molding device should be started up again, and thus work efficiency decreases. In addition, a molding material is also wasted. Therefore, simulation of a case where the molding conditions are changed is desired.

In addition, the inflation molding device of the related art can estimate only average stress generated at bubbles. Even when the average stress generated at the bubbles is equal to or lower than a breakage threshold, the bubbles naturally break, for example, in a case where the highest stress generated at the bubbles (hereinafter, also referred to as maximum stress) exceeds the breakage threshold. That is, in a case where only the average stress can be estimated, highly accurate break prediction cannot be made. Therefore, estimation of a distribution of stress generated at bubbles is desired.

Hereinafter, an inflation molding device according to the present embodiment will be described.

Figure 1:
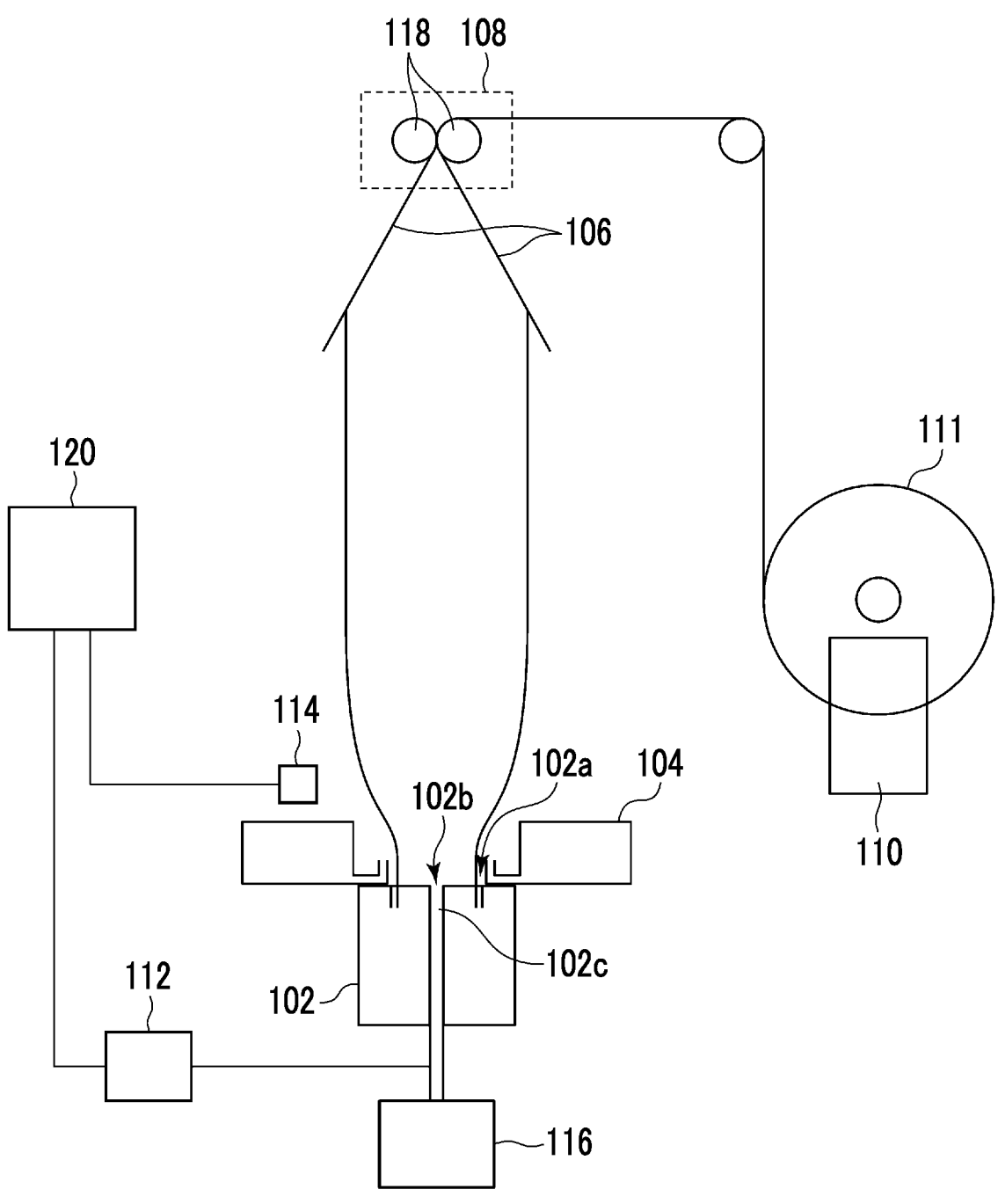
FIG. 1 is a view showing a schematic configuration of a film molding device according to one embodiment.

FIG. 1 is a view showing a schematic configuration of an inflation molding device 100 according to the embodiment. The inflation molding device 100 includes a die 102, a cooling unit 104, a pair of guide units 106, a pick-up machine 108, a winding machine 110, a pressure detector 112, a temperature detection unit 114, air supply means 116, and a control device 120.

Hereinafter, on a plane perpendicular to a center axis C, a direction along the circumference of a circle about the center axis C will be described as a circumferential direction.

A melted molding material is discharged in a cylindrical shape from a ring-shaped discharge port 102a formed in the die 102. Inside the discharged molding material having the cylindrical shape, air is ejected at an appropriate timing from an air outlet 102b formed in a center portion of the die 102, and a thin film (hereinafter, also called as a "bubble") that has been swollen into a cylindrical shape is molded.

The cooling unit 104 is disposed above the die 102. The cooling unit 104 blows cooling air to a bubble and cools the bubble.

The pair of guide units 106 are disposed above the cooling unit 104. The pair of guide units 106 guide the bubble to the pick-up machine 108. The pick-up machine 108 is disposed above the guide unit 106. The pick-up machine 108 includes a pair of pinch rolls 118. The pair of pinch rolls 118 are driven and rotated by a motor (not shown) and fold the guided bubble flat while pulling up the guided bubble. The winding machine 110 winds the folded film and forms a film roll body 111.

The temperature detection unit 114 detects a temperature distribution of a bubble surface. The temperature detection unit 114 is an infrared camera that detects the temperature distribution, such as a thermography. The temperature detection unit 114 is not limited to the infrared camera and may be, for example, a non-contact temperature sensor that detects the temperature of a spot (dot). In this case, by mounting the temperature detection unit 114 on, for example, a robot arm and detecting the temperature of the bubble surface while being moved in the surroundings of the bubble, the temperature distribution of the bubble surface may be detected. The temperature detection unit 114 transmits the detection result to the control device 120.

The air supply means 116 sends surrounding air to an air supply path 102*c*, and the air blows from the air outlet 102*b*. That is, the air supply means 116 supplies air into the bubble.

The pressure detector 112 detects a pressure in the air supply path 102*c*. The pressure detector 112 may be provided in the bubble. The pressure detector 112 transmits the detection result to the control device 120.

The control device 120 is a device that comprehensively controls the inflation molding device 100. For example, based on data acquired during molding of a film, the control device 120 estimates a viscosity distribution of a molding material or estimates a viscosity parameter in a viscosity model formula of the molding material.

Figure 2:
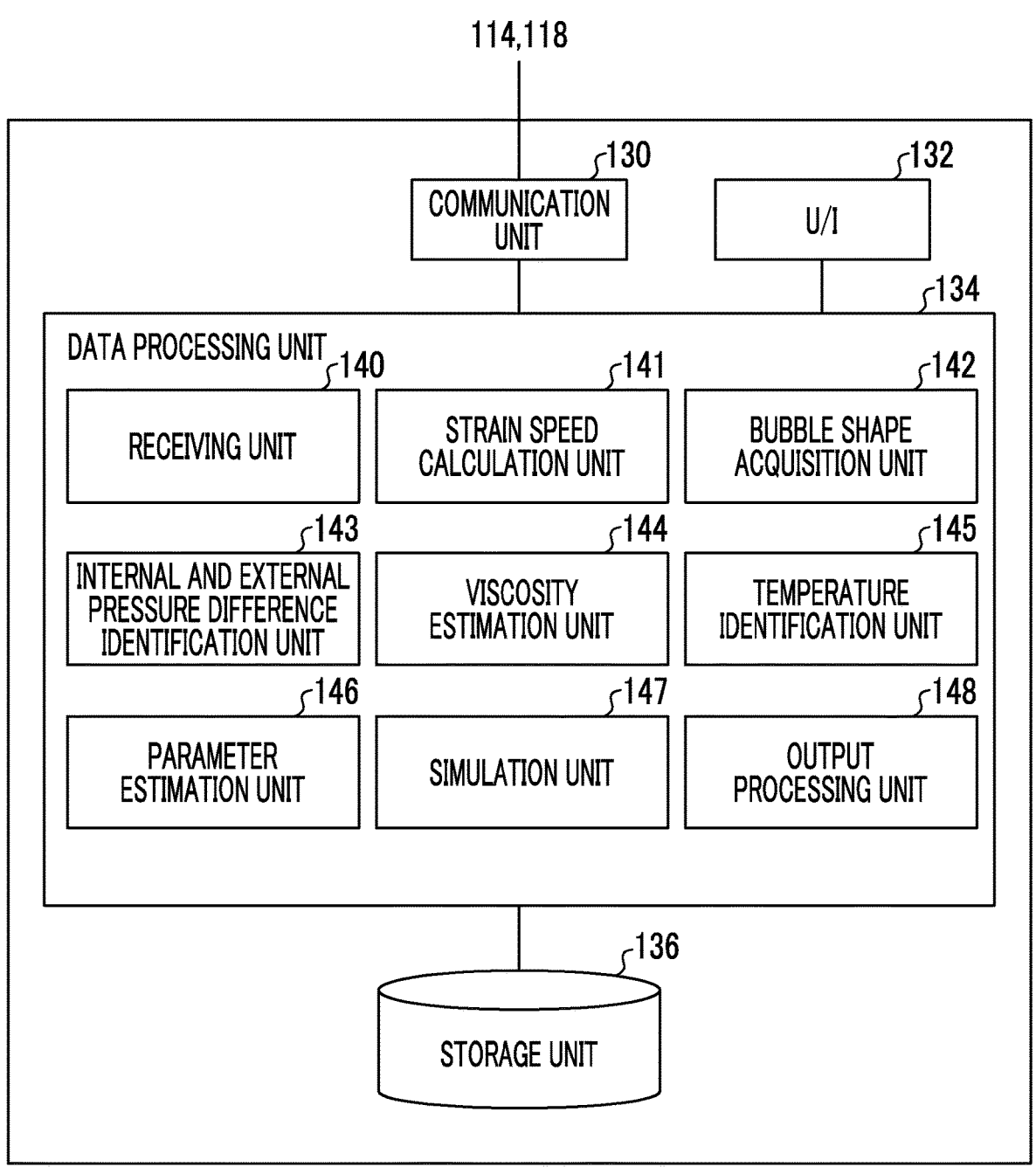
FIG. 2 is a block diagram schematically showing a function and a configuration of a control device of FIG. 1.

FIG. 2 is a block diagram schematically showing a function and a configuration of the control device 120. Each block shown herein can be realized by an element or a mechanical device including a CPU of a computer as hardware and is realized by a computer program or the like as software, but is shown as a functional block realized in cooperation therewith herein. Therefore, it is clear for those skilled in the art that the functional blocks can be realized in various manners in combination with hardware and software.

Figure 3:
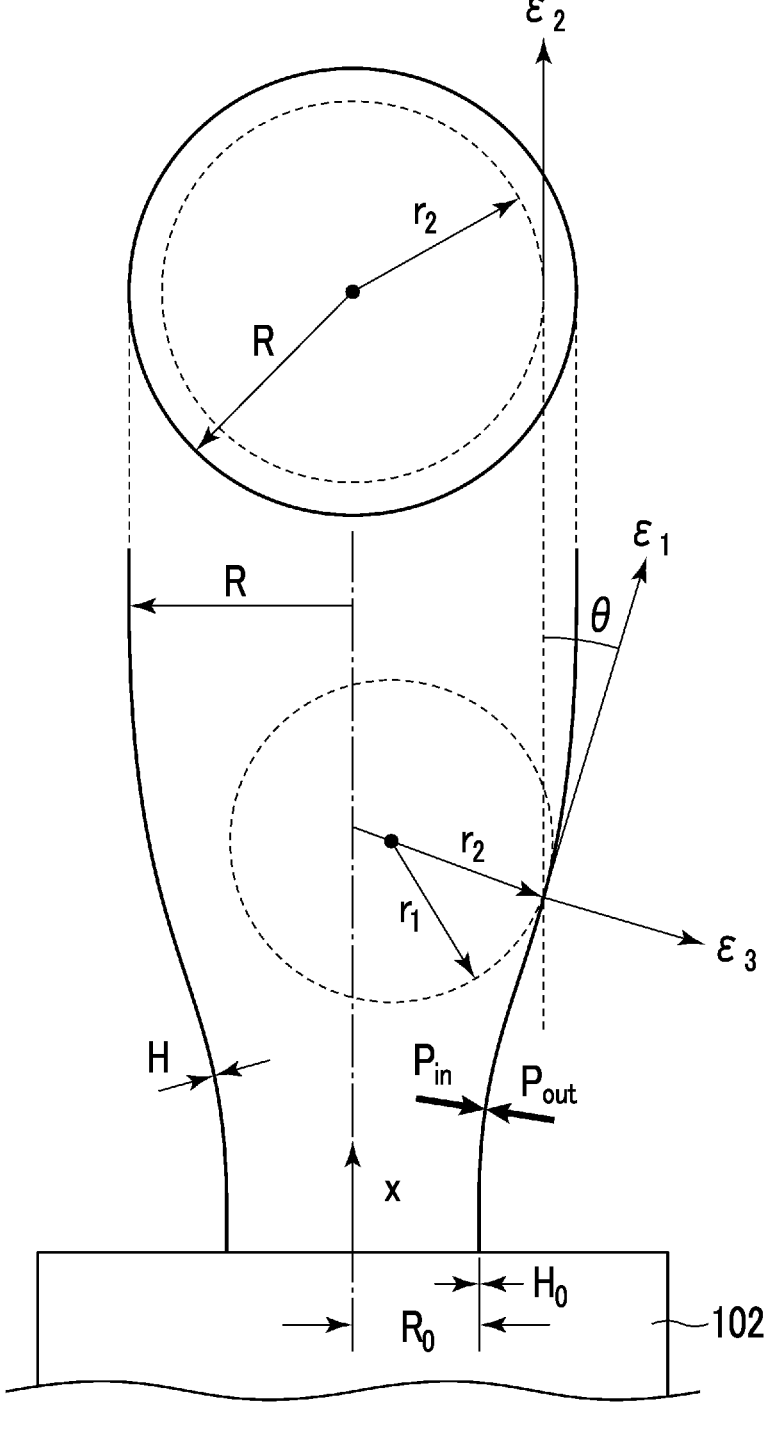
FIG. 3 is a view for describing various types of variables related to a bubble.

FIG. 3 is a view for describing various types of variables related to a bubble. A lower view in FIG. 3 is a sectional view of the bubble cut by a plane including the center axis C, and an upper view is a sectional view of the bubble cut by a horizontal plane. In FIG. 3, x is a bubble height. The bubble height is a height with an upper surface of the die 102 as a reference surface and can also be called a distance from the upper surface of the die 102 in a vertical direction. In addition to FIG. 2, FIG. 3 will be referred to.

The control device 120 includes a communication unit 130 that executes communication processing with the temperature detection unit 114 or the pressure detector 112 in accordance with various communication protocols, a U/I unit 132 that receives an operation input by a user and that causes a display unit to display various types of screens, a data processing unit 134 that executes various types of data processing based on data acquired from the communication unit 130 and the U/I unit 132, and a storage unit 136 that stores data referenced and updated by the data processing unit 134.

The data processing unit 134 includes a receiving unit 140, a strain speed calculation unit 141, a bubble shape acquisition unit 142, an internal and external pressure difference identification unit 143, a viscosity estimation unit 144, a temperature identification unit 145, a parameter estimation unit 146, a simulation unit 147, an output processing unit 148, and a stress estimation unit 149.

The receiving unit 140 receives bubble surface temperature data from the temperature detection unit 114. In addition, the receiving unit 140 receives in-bubble pressure data from the pressure detector 112.

The bubble shape acquisition unit 142 acquires bubble shape data. The bubble shape acquisition unit 142 acquires the bubble shape data by analyzing an image of the temperature distribution of the bubble surface detected by the temperature detection unit 114. As a modification example, the bubble shape acquisition unit 142 may acquire the bubble shape data by analyzing a bubble visible light image captured by a visible light camera.

The bubble shape data acquired by the bubble shape acquisition unit 142 includes a radius R of a bubble at each bubble height x, a curvature radius $r_1$ in a height direction of a bubble surface, and a curvature radius $r_2$ perpendicular to the curvature radius $r_1$. The curvature radii $r_1$ and $r_2$ correspond to curvature radii represented by the following equations (1) and (2), respectively.

$$R_1 = \frac{\left(1+\left(\frac{dR}{dx}\right)^2\right)^{\frac{3}{2}}}{\frac{\partial^2 R}{\partial x^2}} \tag{1}$$

$$R_2 = \frac{R}{\cos\theta} \tag{2}$$

The strain speed calculation unit 141 calculates a strain speed of a bubble at each bubble height x. Specifically, the strain speed calculation unit 141 calculates a flowing direction strain speed ($\varepsilon_1$ dot), a radial direction strain speed ($\varepsilon_2$ dot), and a film thickness direction strain speed ($\varepsilon_3$ dot) at each bubble height x. The strain speeds $\varepsilon_1$ dot, $\varepsilon_2$ dot, and $\varepsilon_3$ dot are calculated through the following equations (3) to (5), respectively.

$$\dot{\varepsilon}_1 = \cos\theta \frac{\partial v}{\partial x} \tag{3}$$

$$\dot{\varepsilon}_2 = \frac{v\cos\theta}{R} \frac{\partial R}{\partial x} \tag{4}$$

$$\dot{\varepsilon}_3 = \frac{v\cos\theta}{H} \frac{\partial H}{\partial x} = -\cos\theta \frac{\partial v}{\partial x} - \frac{v\cos\theta}{R} \frac{\partial R}{\partial x} \tag{5}$$

It is known that a film movement speed v is represented by a triangular function having a bubble height as the horizontal axis, takes a lowest value immediately after exiting the discharge port 102*a*, and takes a highest value when reaching the pick-up machine 108. Therefore, when a film movement speed at each of the discharge port 102*a* and the pick-up machine 108 is known, the film movement speed v at each bubble height x can be estimated. A film movement speed at the discharge port 102*a* can be calculated based on a molding material extrusion amount (mass flow rate), a molding material melt density, a radius $R_0$ of the discharge port 102*a*, and a lip width (the width of the discharge port 102*a*) $H_0$. A film movement speed at the pick-up machine 108 is equal to a pick-up speed that is a speed at which the pick-up machine 108 picks up (pulls) a film and can be identified by detecting the number of rotations of the motor driving the pair of pinch rolls 118.

A method of estimating (identifying) the film movement speed v at each bubble height x is not limited thereto, and the film movement speed may be estimated (identified) through other known methods.

The internal and external pressure difference identification unit 143 identifies an internal and external pressure difference $\Delta P(x)$ at each bubble height x, that is, a distribution of the internal and external pressure difference, which is represented by the following equation (6).

$$\Delta P(x) = P_{in}(x) - P_{out}(x) \tag{6}$$

Herein, $P_{in}(x)$: internal pressure of bubble at bubble height x, and $P_{out}(x)$: cooling air pressure at bubble height x.

Since air has a weight, the density of the air changes depending on a height, and thereby a pressure changes depending on the height. In general, when the height is increased by 1 m, the pressure decreases by 10 Pa. Therefore, the internal and external pressure difference identification unit 143 identifies an internal pressure $P_{in}(x)$ at the bubble height x in consideration of a height difference between a detection position of the pressure detector 112 and the bubble height x at a pressure detected by the pressure detector 112.

A cooling air pressure $P_{out}(x)$ may be identified based on simulation of cooling air or may be detected using a pressure gauge.

The internal pressure $P_{in}(x)$ and the cooling air pressure $P_{out}(x)$ essentially depend on the bubble height x, but may be constant regardless of the bubble height x. For example, the internal pressure $P_{in}(x)$ may be a pressure detected by the pressure detector 112 or a pressure based thereon.

In addition, the cooling air pressure $P_{out}(x)$ may be ignored, that is, the cooling air pressure $P_{out}(x)=0$ may be satisfied.

The stress estimation unit 149 estimates stress, that is, a stress distribution at each bubble height based on a known relational equation related to stress generated at a bubble and a bubble internal and external pressure difference ΔP. The stress is uniform in the circumferential direction.

The viscosity estimation unit 144 estimates a viscosity η(x) at each bubble height x, that is, a viscosity distribution in the height direction. The viscosity estimation unit 144 makes estimation based on various types of known relational equations, the curvature radius $r_1$ and the curvature radius $r_2$ at each bubble height x acquired by the bubble shape acquisition unit 142, and stress estimated by the stress estimation unit 149. The viscosity of a bubble is uniform in the circumferential direction.

The temperature identification unit 145 identifies the temperature of a bubble at each bubble height x. For example, the temperature identification unit 145 may identify the temperature of the bubble at each bubble height x from a temperature distribution detected by the temperature detection unit. For example, the temperature of the bubble may be uniform in the circumferential direction, and a temperature at each bubble height x at a certain circumferential position may be a temperature at each bubble height.

In addition, for example, the temperature identification unit 145 may identify the temperature of the bubble at each bubble height x from the temperature of the die 102. The more time has passed since the discharge of a molding material, that is, a bubble at a higher position is cooled. In consideration of this, the temperature identification unit 145 may identify the temperature of the bubble at each bubble height x from the temperature of the die 102.

The parameter estimation unit 146 estimates viscosity parameters of a molding material. The viscosity parameters are parameters $k_0$, A, B, C, m (mass flow rate), $C_1$, $C_2$, and $T_{ref}$ (reference temperature) in a viscosity model equation represented by the following equation (7).

$$\eta = k_0(1 - \exp(-A\varepsilon))\exp(B\varepsilon^c)(\dot{\varepsilon}^{m-1})\exp\left(-\frac{C_1(T - T_{ref})}{T - (T_{ref} - C_2)}\right) \quad (7)$$

Herein,

T: temperature of bubble.

In addition, a strain speed ε dot and strain ε are calculated through the following equations (8) and (9).

$$\dot{\varepsilon} = \sqrt{\dot{\varepsilon}_1^2 + \dot{\varepsilon}_2^2 + \dot{\varepsilon}_3^2} \quad (8)$$

6

-continued $$\varepsilon = \int_0^t \dot{\varepsilon}dt = \int_0^x \dot{\varepsilon}\frac{\partial t}{\partial x}dx = \int_0^x \frac{\dot{\varepsilon}}{v}dx \quad (9)$$

The parameter estimation unit 146 estimates a viscosity parameter by fitting the viscosity model equation represented by the equation (7) to the viscosity distribution estimated by the viscosity estimation unit 144.

The simulation unit 147 executes simulation using the estimated viscosity parameter. The simulation unit 147 calculates the shape and stress of a bubble by inputting molding conditions. The molding conditions include, for example, a molding material extrusion amount, a pick-up speed, a blow ratio, a die temperature, and a cooling air amount.

For example, the simulation unit 147 may execute simulation by inputting the current molding conditions during molding. When the current molding conditions during molding are input, it is possible to know whether or not there is a possibility in which a bubble during molding breaks. In a case where there is a possibility in which the bubble breaks, the user may be notified of the fact through screen display, voice, or other methods. In this case, the simulation unit 147 may calculate and present molding conditions under which a film that has no possibility of breakage and that has a high quality can be molded. In addition, the molding conditions may be automatically changed.

In addition, for example, the simulation unit 147 may calculate the shape and stress of the bubble in a case where molding conditions have changed, by inputting molding conditions planned to be changed. In this case, for example, it is possible to know whether or not there is a possibility of breakage by changing the molding conditions.

The output processing unit 148 displays various types of screens on a predetermined display. The various types of screens may be, for example, a screen showing a stress distribution of a bubble during molding, which is estimated by the stress estimation unit 149, may be, for example, a screen showing a viscosity parameter of a bubble during molding, which is estimated by the parameter estimation unit 146, or may be, for example, a diagram showing a screen related to simulation. As a modification example, the output processing unit 148 may perform printing using a predetermined printer or may transmit an e-mail to a predetermined e-mail address as output processing, instead of displaying on the display.

Figure 4:
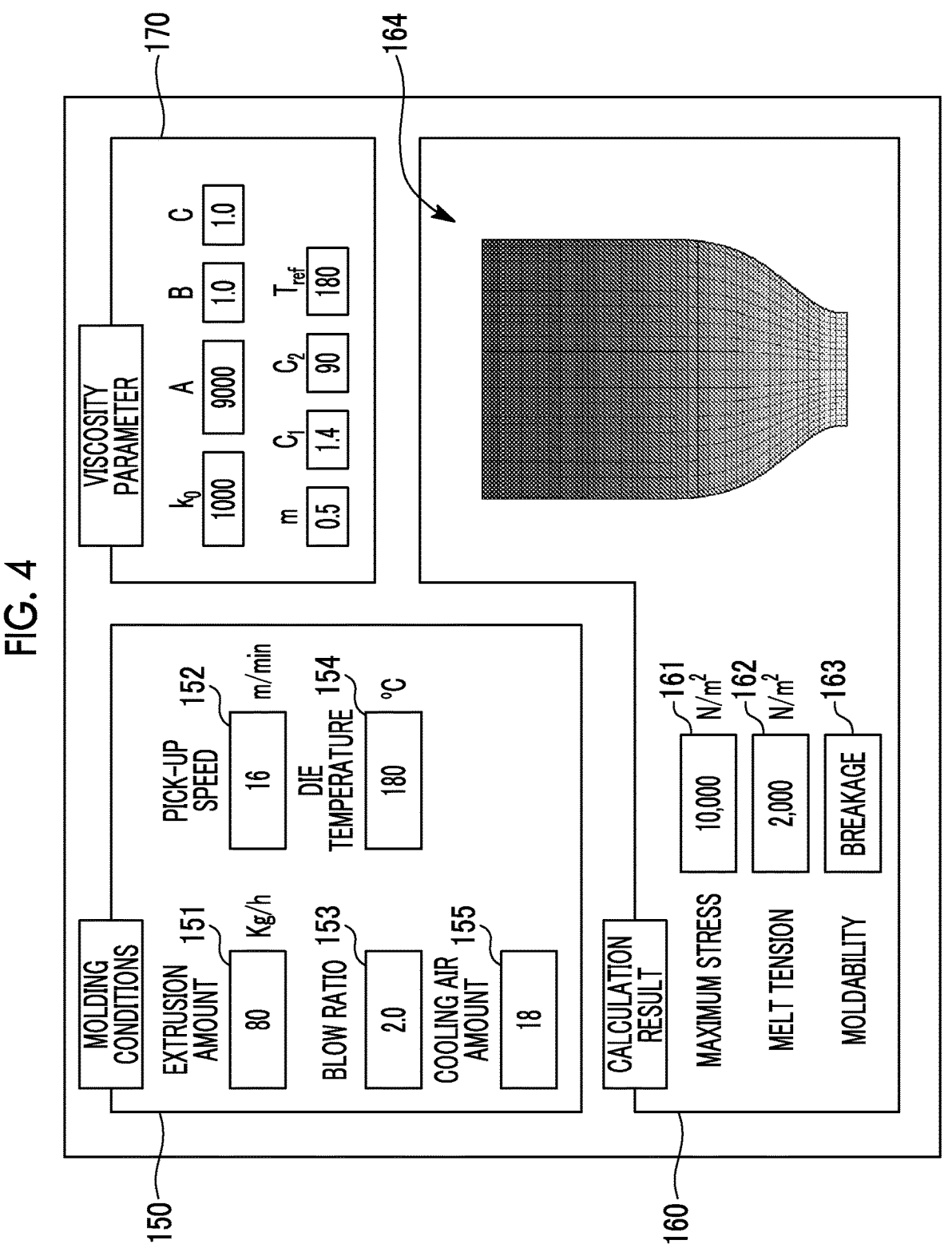
FIG. 4 is a diagram showing a simulation screen.

FIG. 4 is a diagram showing a simulation screen. The simulation screen includes a molding conditions field 150, a calculation result field 160, and a viscosity parameter field 170.

The molding conditions field 150 includes an extrusion amount field 151, a pick-up speed field 152, a blow ratio field 153, a die temperature field 154, and a cooling air amount field 155. A molding material extrusion amount (Kg/h) is input to the extrusion amount field 151. The pick-up speed (m/min) of the pick-up machine 108 is input to the pick-up speed field 152. A blow ratio is input to the blow ratio field 153. A die setting temperature is input to the die temperature field 154. The cooling air amount ($m^3$/min) of the cooling unit 104 is input to the cooling air amount field 155.

The viscosity parameters $k_0$, A, B, C, m, $C_1$, $C_2$, and $T_{ref}$ estimated by the parameter estimation unit 146 are displayed in the viscosity parameter field 170. The simulation unit 147 of the control device 120 calculates the shape and stress of a bubble using the viscosity parameters displayed in the viscosity parameter field 170 by inputting the molding conditions input to the molding conditions field 150.

The calculation result field 160 includes a maximum stress field 161, a melt tension field 162, a moldability field 163, and a shape display field 164. The calculated maximum stress is displayed in the maximum stress field 161. The calculated melt tension is displayed in the melt tension field 162. The melt tension field 162 shows a force acting on a melted molding material in a film moving direction. Moldability is displayed in the moldability field 163. A bubble shape is shown in the shape display field 164. The color of a bubble to be displayed in the shape display field 164 may be changed according to information related to the bubble such as the radius of the bubble and stress generated at the bubble. For example, as in the shown example, the bubble may be displayed in a light color where the radius is small and in a dark color where the radius of the bubble is large. In addition, for example, the bubble may be displayed in a light color where generated stress is low and in a dark color where the generated stress is high.

When maximum stress becomes equal to or higher than a predetermined threshold, the bubble breaks. Therefore, by referring to the maximum stress field 161, it is possible to check whether or not the bubble breaks and in a case where the bubble is estimated to break, to what extent the bubble exceeds the threshold.

When melt tension is not equal to or higher than a predetermined threshold, the bubble is not stretched taut, and thereby molding is impossible. Therefore, by referring to the melt tension field 162, it is possible to check whether or not the bubble is stretched taut, that is, whether the bubble can be molded, and in a case where it is estimated that the bubble cannot be molded, to what extent the bubble falls below the threshold.

Next, an operation of the inflation molding device 100 configured as described above will be described.

(1) The bubble shape acquisition unit 142 acquires bubble shape data at each bubble height x based on an image of a temperature distribution of a bubble surface.

(2) The strain speed calculation unit 141 calculates strain speeds $\varepsilon_1$ dot, $\varepsilon_2$ dot, and $\varepsilon_3$ dot at each bubble height x.

(3) The internal and external pressure difference identification unit 143 identifies a bubble internal and external pressure difference at each bubble height x.

(4) The stress estimation unit 149 estimates stress generated at a bubble at each bubble height x based on the bubble internal and external pressure difference.

(5) The viscosity estimation unit 144 estimates the viscosity of the bubble at each bubble height x, that is, a viscosity distribution of the bubble based on the bubble shape data acquired by the bubble shape acquisition unit 142 and the stress estimated by the stress estimation unit 149.

(6) The temperature identification unit 145 identifies the temperature of the bubble at each bubble height x based on the image of the temperature distribution of the bubble surface.

(7) The parameter estimation unit 146 estimates a viscosity parameter of the bubble based on the viscosity distribution of the bubble and the temperature of the bubble.

(8) The simulation unit 147 executes simulation using the estimated viscosity parameter.

The processing order is merely an example, and processing order may be changed, or some processing may be executed in parallel with other processing insofar as there is no inconsistency.

Next, effects of the present embodiment will be described. In the present embodiment, stress generated at a bubble is estimated based on a bubble internal and external pressure difference ΔP. In this case, an estimation error becomes smaller compared to a case where stress is estimated based on torque of the motor driving the pinch roll 118. That is, a more accurate stress distribution is estimated. Herein, even when average stress generated at the bubble is equal to or lower than the breakage threshold, the bubble naturally breaks when maximum stress exceeds the breakage threshold. That is, as the maximum stress can be more accurately estimated, more accurate break prediction becomes possible.

In addition, in the present embodiment, a stress distribution of a bubble is estimated, and a viscosity distribution of the bubble is estimated based thereon. The estimated viscosity distribution can be useful for adjusting molding conditions. For example, in a case where the quality of a molded film is poor, when the current viscosity distribution and a viscosity distribution when the quality of the film is good are compared to each other and it is known that both are different from each other, for example, it is possible to know that adjustment such as raising and lowering the temperature of a resin is preferable.

In addition, in the present embodiment, a viscosity parameter of a molding material can be estimated, and the shape and stress of a bubble can be calculated by inputting molding conditions. Accordingly, for example, in a case where molding conditions are appropriately set and molding is started in a situation where appropriate molding conditions are not known, whether the molding conditions are to be kept as it is or whether the molding conditions are to be changed since there is a possibility of breakage or the like can be determined. In addition, the molding conditions under which a film that has no possibility of breakage and that has a high quality can be molded can be presented. It is also possible to automatically change the molding conditions.

In addition, for example, in a case where molding conditions are changed for some reason, whether there is no problem with molding conditions planned to be changed or whether a change into the molding conditions planned to be changed is not appropriate since there is a possibility of breakage or the like can be determined.

In addition, in the present embodiment, stress generated at a bubble is estimated based on a bubble internal and external pressure difference ΔP. In this case, an estimation error becomes smaller compared to a case where stress is estimated based on torque of the motor driving the pinch roll 118.

The present invention has been described hereinbefore based on the embodiment. The embodiment is an example. It is clear for those skilled in the art that various modification examples are possible for a combination of each component and each processing process, and such modification examples are also within the scope of the present invention. Hereinafter, such modification examples will be described.

Modification Example 1

Although stress generated at a bubble, a viscosity of the bubble, a bubble temperature, and the like are uniform in the circumferential direction in the embodiment, each of the values at positions in the circumferential direction may be estimated assuming that these may not be uniform in the circumferential direction.

Modification Example 2

Unlike the embodiment, the stress estimation unit 149 may estimate stress based on torque of the motor driving the pinch roll 118, instead of an internal and external pressure difference $\Delta P$. Then, the viscosity estimation unit 144 may estimate a viscosity, and the parameter estimation unit 146 may estimate a viscosity parameter, assuming that the stress has been uniformly generated at a bubble in the height direction. In this case, a viscosity distribution of a bubble cannot be estimated, but the viscosity parameter of the bubble can be estimated although the viscosity parameter is a value in a case where stress estimated based on a pick-up speed has been uniformly generated at the bubble in the height direction.

Modification Example 3

Unlike the embodiment, the parameter estimation unit 146 may estimate a viscosity parameter assuming that the temperature of a bubble is uniform in the height direction. In this case, it is sufficient that the temperature detection unit 114 is a non-contact temperature sensor that detects the temperature of a spot (dot). Alternatively, a uniform bubble temperature may be estimated based on the temperature of the die 102. In this case, the temperature detection unit 114 is unnecessary. The bubble shape acquisition unit 142 may acquire bubble shape data by analyzing a bubble visible light image captured, for example, by a visible light camera. In addition, in a case where the shape of the bubble is acquired through a method not using an image of a temperature distribution of a bubble surface, for example, the bubble shape acquisition unit 142 acquires bubble shape data from a visible light image, the temperature of the bubble is unnecessary in estimating the viscosity distribution of the bubble. Thus, the temperature detection unit 114 is unnecessary in estimating the viscosity distribution of the bubble.

Although the present invention has been described using specific phrases based on the embodiment, the embodiment merely shows one aspect of the principles and applications of the present invention, and many modification examples and changes in disposition are allowed without departing from the gist of the present invention defined in the claims.

The present invention relates to the inflation molding device.

It should be understood that the invention is not limited to the above-described embodiment, but may be modified into various forms on the basis of the spirit of the invention. Additionally, the modifications are included in the scope of the invention.

What is claimed is:

1. An inflation molding device comprising:
a temperature sensor configured to measure a temperature of a bubble discharged from a die;
a camera configured to capture an image of the bubble; and
a processor configured to execute
    acquiring bubble shape data from the image of the bubble captured by the camera,
    calculating a strain ($\epsilon$) and a strain rate ($\dot{\epsilon}$) of the bubble based on the acquired bubble shape data,
    estimating one or more viscosity parameters of the bubble based on the calculated strain ($\epsilon$), the calculated strain rate ($\dot{\epsilon}$), and the measured temperature,
    receiving an input of a molding condition, and
    performing a simulation to calculate a shape or a stress of the bubble using the input molding condition and the estimated viscosity parameters,
wherein the viscosity parameters are coefficients of a viscosity model equation representing a viscosity ($\eta$) of the bubble as a function of the strain ($\epsilon$), the temperature, and the strain rate ($\dot{\epsilon}$), and
the viscosity parameters are the coefficients used as a multiplier, a divisor, or an exponent for the strain ($\epsilon$), the temperature, or the strain rate ($\dot{\epsilon}$) in the equation representing the viscosity ($\eta$).

2. The inflation molding device according to claim 1,
wherein the camera is an infrared camera that acquires a bubble temperature distribution image, and
the processor is configured to execute
    estimating the viscosity ($\eta$) of the bubble using a shape of the bubble identified based on the bubble temperature distribution image acquired by the infrared camera, and
    identifying the temperature of the bubble based on the bubble temperature distribution image acquired by the infrared camera.

3. The inflation molding device according to claim 1,
wherein the processor is configured to execute performing a simulation to calculate a stress distribution of the bubble by using the estimated viscosity parameters.

4. The inflation molding device according to claim 3,
wherein the processor is configured to execute
    estimating the stress distribution of the bubble, and
    estimating a viscosity distribution of the bubble based on the estimated stress distribution of the bubble.

* * * * *